United States Patent [19]

Singhal et al.

[11] Patent Number: 5,086,027

[45] Date of Patent: Feb. 4, 1992

[54] NOVEL NOBLE METAL SUPPORTED HYDROTREATING CATALYSTS

[75] Inventors: Gopal H. Singhal; William E. Winter; Kenneth L. Riley; Kenneth L. Trachte, all of Baton Rouge, La.

[73] Assignee: Exxon Research and Engineering Company, Florham Park, N.J.

[21] Appl. No.: 631,303

[22] Filed: Dec. 18, 1990

[51] Int. Cl.$^5$ ............................................. B01J 31/12
[52] U.S. Cl. ..................................... 502/166; 502/162; 502/167; 502/168; 502/220; 502/221
[58] Field of Search ............... 502/162, 166, 167, 168, 502/220, 221

[56] References Cited

U.S. PATENT DOCUMENTS 4,775,652  10/1988  Aldag, Jr. et al. ................... 502/162

Primary Examiner—Patrick P. Garvin
Assistant Examiner—Brent M. Peebles
Attorney, Agent, or Firm—Henry E. Naylor

[57] ABSTRACT

A catalyst composition comprised of: about 0.005 to 5.0 wt. % noble metal, about 0.5 to 5 wt. % of at least one Group VIII metal, and about 3 to 18 wt. % of a Group VI metal, and a refractory support, wherein the noble metal is incorporated into the refractory support by use of a precursor represented by $ML_2$ when the noble metal is Pt or Pd and $ML_3$, when the noble metal is Rh or Ir, where M is the noble metal and L is a ligand selected from the dithiocarbamates, dithiophosphates, dithiophosphinates, xanthates, thioxanthates, and further wherein L has organo groups having a sufficient number of carbon atoms to render the noble metal complex soluble in oil.

8 Claims, 1 Drawing Sheet

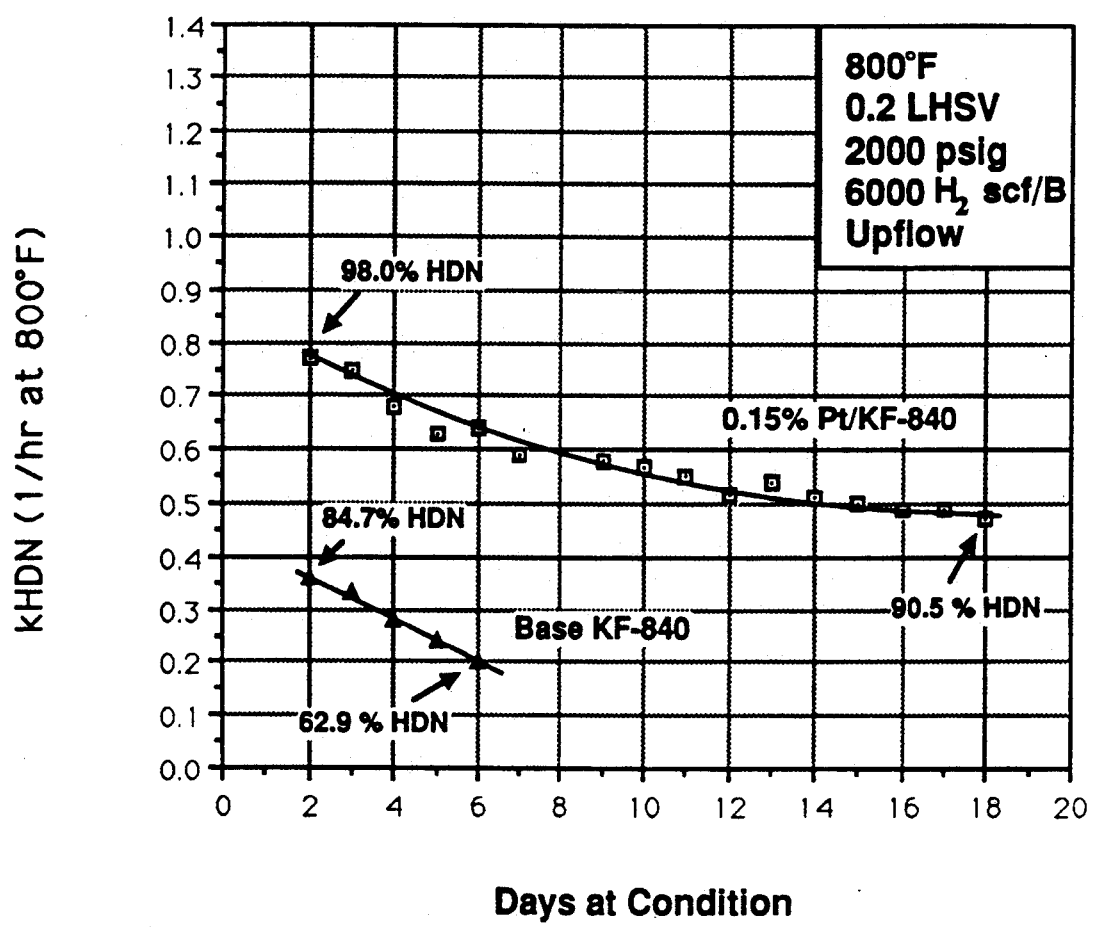

NOVEL NOBLE METAL SUPPORTED HYDROTREATING CATALYSTS

FIELD OF THE INVENTION

The present invention relates to catalysts for heteroatom removal, particularly nitrogen, from petroleum and synthetic fuel feedstocks. The catalyst is comprised of at least one Group VIII metal, at least one Group VI metal, and a noble metal, on a refractory support. The noble metal is incorporated onto the support by use of specific noble metal precursors, such as xanthates and dithiocarbamates.

BACKGROUND OF THE INVENTION

Hydrotreating of petroleum feedstocks and various boiling fractions thereof has become increasingly important because of more stringent product quality requirements. Furthermore, the petroleum industry foresees the time when it will have to turn to relatively high boiling feeds derived from such materials as coal, tar sands, oil-shale, and heavy crudes. Feeds derived from such materials generally contain significantly more deleterious components, such as sulfur, nitrogen, oxygen, halides, and metals. Consequently, such feeds require a considerable amount of upgrading in order to reduce the content of such components, thereby making them more suitable for further processing, such as fluid catalytic cracking and/or cracking and/or catalytic reforming.

Hydrotreating of hydrocarbonaceous feeds is well known in the art and usually requires treating the feed with hydrogen in the presence of a supported catalyst at hydrotreating conditions. The catalyst is typically comprised of a Group VI metal with one or more Group VIII metals as promoters on a refractory support. Hydrotreating catalysts particularly suitable for hydrodesulfurization or hydrodenitrogenation generally contain molybdenum on alumina promoted with a metal such as cobalt, nickel, and iron. Cobalt promoted molybdenum on alumina are most widely used for hydrodesulfurization, while nickel promoted molybdenum on alumina catalysts are the most widely used for hydrodenitrogenation.

Further, hydrotreating catalysts containing platinum are known. For example, U.S. Pat. No. 3,422,000 discloses hydrotreating with a catalyst consisting essentially of 0.005 to 5 wt. % of a platinum series metal and about 4 to 30 wt. % of molybdena on alumina, the catalyst having been resulfided.

While catalysts containing molybdenum with nickel, cobalt, or both, are in extensive commercial use today, they nevertheless have limitations with respect to removing heteroatoms from heavy feeds, such as heavy coker gas oil and coal derived gas oils. As the feeds become heavier, the content of condensed aromatic hydrocarbons, with and without heteroatoms, increases. These condensed aromatics can absorb strongly on the catalyst sites, reducing both the rate and extent of heteroatom removal. Consequently, there exist a need in the art for improved hydrotreating catalysts having increased activity toward such heavy feeds, particularly when the heteroatom to be removed is nitrogen.

BRIEF DESCRIPTION OF THE FIGURE

The FIGURE shows first order rate constants for hydrodenitrogenation of a coal derived vacuum gas oil using a commercially available Ni/Mo on alumina catalyst (KF-840) in a fixed bed upflow reactor at 2000 psig hydrogen and 800° F. Rate constants for the same commercial catalyst with 0.15% Pt added as PtEEX are also shown. From the rate constants, it is apparent that the Pt promoted catalyst is much superior.

SUMMARY OF THE INVENTION

In accordance with the present invention, there is provided a catalyst composition comprised of: about 0.005 to 5.0 wt. % noble metal, about 0.5 to 5 wt. % of at least one Group VIII metal, and about 3 to 18 wt. % of a Group VI metal, and a refractory support, wherein the noble metal is incorporated into the refractory support by use of a precursor represented by $ML_2$ when the noble metal is Pt or Pd, and $ML_3$, when the noble metal is Rh or Ir, where M is the noble metal and L is a ligand selected from the dithiocarbamates, dithiophosphates, xanthates, thioxanthates, and further wherein L has organo groups having a sufficient number of carbon atoms to render the noble metal complex soluble in oil.

In one preferred embodiment of the present invention, the noble metal is platinum and the platinum precursor is a xanthate or dithiocarbamate.

In another preferred embodiment of the present invention, the catalyst is comprised of about 5 to 15 wt. % Mo, 1 to 5 wt. % Ni(Co), and 0.01 to 2.5 wt. % platinum, on an alumina support.

DETAILED DESCRIPTION OF THE INVENTION

A variety of feedstocks can be hydrotreated with the catalysts of the present invention, including hydrocarbonaceous fractions and whole feeds. Non-limiting examples of such feeds include organic solvents, light, middle and heavy petroleum distillates, as well as petroleum residual feeds, other feedstocks include coal derived liquids, shale oil, and heavy oils derived from tar sands.

In the practice of the present invention, a heteroatom containing feed, especially a high nitrogen containing feedstream, is contacted with hydrogen at hydrodenitrogenation conditions in the presence of a supported catalyst of the present invention. The catalyst is comprised of a noble metal, at least one Group VIII metal, and at least one Group VI metal, on an inorganic oxide support. The noble metal is present in an amount ranging from about 0.005 to about 5 wt. %, based on the total weight of the catalyst, preferably, about 0.01 to about 2.5 wt. %, most preferably 0.1 to 1%.

Noble metals suitable for use herein include platinum, palladium, rhodium, and iridium. Preferred are platinum and rhodium, and more preferred is platinum. The Group VIII metal is present in an amount ranging from about 0.5 to 5 wt. %, preferably from about 1 to 4 wt. %. Preferred Group VIII metals include Ni, Fe, and Co, with Ni being most preferred. The preferred Group VI metal is Mo which is present in an amount ranging from about 3 to 20 wt. %, preferably from about 5 to 15 wt. %, and more preferably form about 8 to 14 wt. %.

It is critical that certain noble metal precursors be used in preparing the catalysts of the present invention. The noble metal precursors suitable for use herein are represented by:
$ML_2$ when M is Pt or Pd, and
$ML_3$ when M is Rh or Ir
L is a ligand selected from the dithiocarbamates, dithiophosphates, xanthates, and the thioxanthates, wherein L contains organo groups having a sufficient number of carbon atoms to render the noble metal complex soluble or highly dispersed in a hydrocarbonaceous solvent or feedstock. For example, the organo group can be selected from alkyl, aryl, substituted aryl, and ether groups. Generally, the number of carbon atoms of the organo group will be from about 4 to 30. Preferred are the dithiocarbamates and xanthates.

An example of the preferred xanthates are the alkoxyalkylxanthates represented by the formula:

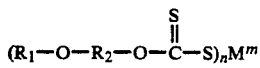

where $R_1$ is an alkyl group (straight, branched, or cyclic); an alkoxy substituted alkyl group; an aryl group; or a substituted aryl group, $R_2$ is a straight or branched alkylene group, M is the noble metal, n is an integer from 1 to 4, preferably from 2 to 3.

Preferably, $R_1$ is a straight alkyl group, a branched alkyl group, or an alkoxy substituted alkyl group. Most preferably, $R_1$ comprises a straight chained alkyl group. Although the number of carbon atoms in $R_1$ can vary broadly, typically $R_1$ will have from about 1 to 24, preferably from 2 to 12, and more preferably from 2 to 8, carbon atoms. Typically, $R_2$ will have from about 2 to 8, preferably from 2 to 4, carbon atoms. Most preferably, $R_1$ and $R_2$ will each have from 2 to 4 carbon atoms. $R_1$ and $R_2$ together should contain a sufficient number of carbon atoms such that the metal alkoxyalkylxanthate is soluble in the oil. Examples of suitable substituted groups in $R_1$ include alkyl, aryl, alkylthio, ester groups, and the like.

Examples of the various metal alkoxyalkylxanthates that can be used in the practice of the present invention are platinum bis(ethoxyethylxanthate), platinum butoxyethylxanthate, platinum propyloxyethylxanthate, platinum isopropyloxyethylxanthate, platinum 2-ethylhexyloxyxanthate, Rh trisethoxyethylxanthate, Rh trisbutoxyethylxanthate, Rh tris(2-ethoxyethalxanthate) etc. Noble metal dithiocarbamates can also be represented by general formula of $ML_2$ and $ML_3$ wherein L is a dialkyl or monoalkyl dithiocarbamate group.

Any suitable support material may be used for the catalysts of the present invention. Preferred are alumina and silica-alumina. More preferred is alumina. Other refractory inorganic compounds may also be present, non-limiting examples of which include zirconia, titania, magnesia, and the like. The alumina can be any of the aluminas conventionally used for hydrotreating catalysts. Such aluminas are generally porous amorphous alumina having an average pore size from about 50 to 200 Å, preferably from about 70 to 150 Å, and a surface area from about 100 to about 350 m²/g, preferably from about 200 to 300 m²/g.

The Group VI and Group VIII (Ni, Fe, Co) metals can be incorporated into the support using any suitable technique such as the incipient wetness technique which is well known in the art. However, the noble metals are incorporated into the catalyst by using the previously mentioned precursor complexes disclosed in this invention. For example, the catalysts can be prepared by first impregnating the support with an aqueous solution of Group VIII and Group VI metal salts. The support can then be dried, calcined, and impregnated with the noble metal precursor in a suitable solvent such as acetone etc.

The instant invention can also be practiced by adding the noble metal precursor directly to the feed, to which a conventional presulfided Mo and Ni and/or Co hydrotreating catalyst is added.

Another example of the preparation of catalysts of this invention includes impregnating a presulfided hydrotreating catalyst as given above with an solution of noble metal complex in a suitable organic solvent.

Heteroatom removal conditions, especially hydrodenitrogenation conditions, will vary considerably depending on such things as the nature of the feed being treated, the nature of the nitrogen being removed, the nature of the complexes being removed, the nature of the complexes employed, and the extent of conversion, if any, desired. In general, however, the following are typical conditions for hydrodenitrogenation of a naphtha boiling within a range of about 25° C., to about 210° C., a diesel fuel boiling within a range from about 170° C. to 350° C., a heavy gas oil boiling within a range of from about 325° C. to about 475° C., a lube oil feed boiling within a range of from about 290° to 500° C., or residuum containing from about 10 percent to about 50 wt. % of material boiling above about 575° C.

TABLE A

| Feed | Temp., °C. | Pressure psig | Space Velocity V/V/Hr. | Hydrogen Gas Rate SCF/B |
|---|---|---|---|---|
| Naphtha | 100–370 | 150–800 | 0.5–10 | 100–2000 |
| Diesel | 200–400 | 250–1500 | 0.5–6 | 500–6000 |
| Heavy | 260–430 | 250–2500 | 0.3–4 | 1000–6000 |
| Lube Oil | 200–450 | 100–3000 | 0.2–5 | 100–10,000 |
| Residuum | 340–450 | 1000–5000 | 0.1–2 | 2000–10,000 |

The following examples are presented to illustrate the invention and should not be considered limiting in any way.

EXAMPLE 1

Synthesis of bis(2-ethoxyethylxanthato)Pt, (PtEEX): To a magnetically stirred solution of 6.7 g. of potassium 2-ethoxyethylxanthate, (KEEX) in 200 ml. of deionized water, was added a filtered solution of potassium tetrachloroplatinate in 150 ml. of deionized water. The initial reddish-brown solution turned turbid, and slowly a yellow precipitate separated out. The mixture was allowed to stir for three hours, the solid collected by filtration, and washed well with deionized water. The solution was air dried and recrystallized from acetone-water to give 4.5 g. (80% conversion) as yellow-orange crystals m.p. 83°–84° C.

EXAMPLE 2

Synthesis of bis(2-ethoxyethylxanthato)Pd, (PdEEX): This compound was prepared from 9.5 g. of (KEEX) and 6.52 g. of potassium tetrachloropalladate according to the procedure given above for PtEEX. The product was obtained in 93% yield as a yellow shiny crystalline solid, m.p. 70° C.

EXAMPLE 3

Synthesis of tris(2-ethoxyethylxanthato)Rh, (RhEEX): This compound was synthesized from 1.92 g. of sodium hexachlororhodium(III) and 4.2 g. of KEEX according to the procedure given above for PtEEX. The product was obtained as a brown-orange crystalline solid, m.p. 75°–76° C.

EXAMPLE 4

Samples of a commercial hydrotreating catalyst designated KF-840, and available from Akzo Chemicals Inc., were presulfided and then treated with various concentrations of the above noble metal precursors in acetone to give the final catalyst as indicated in Table I below. KF-840 is an alumina supported catalyst and is reported to contain about 12.7 wt. % Mo, and 2.5 wt. % Ni, and 6.4 wt. % $P_2O_5$, and has a surface area of about 135 $m^2$/g and a pore volume of about 0.38 cc/g.

TABLE I

| Catalyst | Additive | Catalyst Abbreviation | Catalyst Description |
|---|---|---|---|
| A | $CS_2$ 2.8 g. | KF-840 | Commercial Ni/Mo $Al_2O_3$ Catalyst |
| B | | KF/Pt | KF-840 (3.75 g.) + PtEEX (0.404 g.) |
| C | | KF/Rh | KF-840 (3.75 g.) + RhEEX (0.87 g.) |
| D | | KF/Pd | KF-840 (3.75 g.) + PdEEX (0.615 g.) |
| E | | KF/Pt500 | KF-840 (3.75 g.) + PtEEX (0.101 g.) |
| F | | KF/Pt500(imp) | KF-840 (3.75 g.) + PtEEX (0.101 g.) |

In all the runs, 32-42 mesh KF-840, which was presulfided with a mixture of 10% $H_2S$ in $H_2$ was used.

Activity measurements were performed on the above catalysts in a gas flow-through autoclave fitted with a magnadrive. The reaction temperature was maintained at 800° F., the pressure was 2000 psig $H_2$, residence time was 4 hours, the stirring rate was 1500 rpm and the $H_2$ flow rate was 320 cc/minute. For each experiment, 75 g. of a coal-derived gas oil as described below, and 3.75 g. of KF-840 (Mo+Ni=6055 ppm) were used. In runs on Catalyst B, C, D, and E, EEX complexes of Pt, Rh, and Pd, were added directly to the feed along with the presulfided KF-840. For Catalyst F, the sulfided KF-840 was impregnated by a pore filling method with a solution of PtEEX in acetone. The experiments were conducted in the usual way, all the gaseous products were analyzed by mass spectrophotomic analysis and the liquid products were characterized by elemental analysis. The results are shown in Table II below.

The feed properties were as follows:
C=88.97%; H=7.99%; S=0.321%; O (Calcd.)=1.85%.
H/C Ratio=1.05.
Fractions Boiling at: IBP-400° F.=0%; 400°-650° F.=10.8%; 650° F.+=89.2%.

TABLE II

| Catalyst # | HDS | HDN | H/C Ration |
|---|---|---|---|
| A KF-840 | 64.8 | 80.5 | 1.254 |
| B KF/Pt | 75.5 | 92.5 | 1.269 |
| C KF/Rh | 80.1 | 87.2 | 1.269 |
| D KF/Pd | 81.6 | 82.1 | 1.269 |
| E KF/Pt500 | 90.3 | 94.2 | 1.267 |
| F KF/Pt500(imp) | 90.1 | 94.5 | 1.32 |

It is evident from Table II that Pt and Rh improve the HDN very significantly. Very surprisingly, Pt at lower level has a significantly larger benefit than at higher concentrations. Moreover, impregnation seemed to increase the H/C ratio also. These results are highly unexpected.

In Table III below comparative data on conversion to $C_1$-$C_2$ gases, total $C_1$-$C_4$, as well as 400° F. and 400°-650° F. liquids produced are given.

TABLE III

| Catalyst # | C1-C4 | C1-C2 | 400° F.− | 400-650° F. |
|---|---|---|---|---|
| A | 9.5 | 4.6 | 12.9 | 31.0 |
| B | 4.8 | 2.6 | 12.4 | 36.8 |
| C | 5.3 | 2.8 | 12.9 | 35.0 |
| D | 5.5 | 2.8 | 13.5 | 32.3 |
| E | 3.9 | 1.4 | 15.5 | 36.8 |
| F | 7.4 | 1.8 | 16.0 | 38.2 |

The advantage for HDN of the catalysts of the present invention over KF-840, the conventional catalyst is unmistakable. In addition, the catalysts of this invention lower the gas make and increase the naphtha and distillate yields.

Examples given below describe preparation of Pt doped KF-840 by a conventional incipient wetness technique using inorganic chloroplatinic acid as well by the method of this invention using the precursor complex, PtEEX.

EXAMPLE 5

Preparation of (0.4%) Pt Doped Catalyst by Cloroplatinic Acid: A sample of 100 g. of air exposed KF-840 was stored overnight over water to equilibrate with moisture. The sample weight after the exposure was 119.2 g. It was transferred to a fritted funnel and was covered with water so that the water layer was ⅛" above the solid. Carbon dioxide was bubbled through the sample for 1 hr. To the sample, a solution of 1.0165 g of hydrogen hexachloroplatinum(IV) in 16 ml of deionized water, and 0.216 g. of concentrated hydrochloric acid was added. Carbon dioxide was bubbled through for an additional 4 hrs. The supernatant liquid was decanted off and the sample was air-dried. It was then dried in vacuum at 100° C. overnight and calcined at 427° C. for three hrs. The final product weighed 87.7 g. The catalyst was designated Catalyst G.

EXAMPLE 6

Preparation of 0.3% Pt Doped Catalyst by Using PtEEX: To 50.0 g of KF-840, which was sulfided with 10% $H_2S/H_2$ at 345° C. for 16 hrs, in a porcelain dish, was added, dropwise with manual stirring, a solution of 0.404 g. of PtEEX in 40 ml of acetone. The small amount of the complex on the side of the dish was washed down with 5 ml of acetone. The catalyst was allowed to air dry for 1 hr and then dried in a vacuum desiccator at 110° C. overnight. The catalyst was designated Catalyst H.

EXAMPLE 7

Preparation of 0.15% Pt Doped Catalyst by Using PtEEX: This catalyst was prepared by the method described in Example 6 and was designated Catalyst I.

EXAMPLE 8

Preparation of 0.05% Pt Doped Catalyst by Using PtEEX: This catalyst was prepared by the method described in Example 6 and was designated Catalyst J.

EXAMPLE 9

In this experiment, the Catalysts G, H, J, and KF-840 were compared for upgrading Baton Rouge light cat cycle oil (LCCO). The feed characteristics were as given below:
S=1.47%; N=557 ppm; 10.6° API.
Results are given in Table IV.

TABLE IV

Conditions: 600° F.; 2.0 LHSV; 3500 SCF/B; 1200 psig

| | KF-840 | Catalyst G (KF-840 + 0.4% Pt)* | Catalyst H (KF-840 + 0.3% Pt/PtEEX) |
|---|---|---|---|
| Product S% | 0.36 | 0.39 | 0.38 |
| Product N, ppm | 192 | 138 | 101 |
| °API | 17.1 | 16.7 | 16.8 |

*KF-840 impregnated with 0.4% platinum using hydrogen hexachloroplatinum as the precursor.

As is clear from this table, the catalyst of this invention gives much better HDN than the state-of-the-art catalyst KF-840, or KF-840 impregnated with higher concentration of Pt, but by standard impregnation technique using a precursor such as hydrogen hexachloroplatinum.

EXAMPLE 10

In this experiment, catalysts H, I, J, and KF-840 were compared for upgrading light catalytic cycle oil, as defined in Example 9 above. The objective was to determine the effectiveness of Pt doping at even lower concentration by the process of this invention. Results are given in Table V.

TABLE V

Conditions: 600° F.; 0.85 LHSV; 3500 SCF/B; 1200 psig

| | KF-840 | Catalyst H (KF-840 + .3% Pt) | Catalyst I (KF-840 + .15% Pt) | Catalyst J (KF-840 + .05% Pt) |
|---|---|---|---|---|
| Product S % | 0.238 | 0.232 | 0.232 | 0.224 |
| N ppm prod. | 17.0 | 0.3 | 0.6 | 3.3 |
| °API | 19.0 | 19.4 | 19.4 | 19.4 |

As can be seen from the table, all the catalysts of this invention are much more active for HDN than the standard catalyst, KF-840. Surprisingly, at lower Pt doping, the catalysts also maintain their activity for HDS also.

EXAMPLE 11

A ¼" diameter fixed bed upflow reactor was charged with 5 g. of KF-840. Activity of the catalyst was determined at a variety of conditions with a coal derived mid-distillate feed (0.270% S, 0.958% N Distillate), and with a coal derived vacuum gas oil (0.318% S, 1.026% N VGO). At the start of the run, the mid-distillate feed was spiked with decanethiol (4% S on feed) to sulfide the catalyst. In all cases, the $H_2$ pressure was 2000 psig, and treat gas rates were maintained at 6000 scf/bbl. Further conditions and results are given in Table VI. Upon completion of the run, the catalyst was discharged from the reactor, and replaced with 5 g. of pre-sulfided KF-840 which had been impregnated with 0.15% Pt using PtEEX. Pre-sulfiding was carried out with 10% $H_2S$ in $H_2$ at 650° F. Impregnation was carried out by pore-filling from an acetone solution, then drying in vacuum to remove residual acetone. Conditions and results are given in Table VII.

TABLE VI

| Feed | Temp. (°F.) | LHSV | N in product | kHDN |
|---|---|---|---|---|
| Distillate | 690 | 0.2 | 96 | 0.99 |
| " | 690 | 0.1 | 8 | 0.74 |
| " | 690 | 0.8 | 3526 | 0.94 |
| " | 690 | 0.4 | 1579 | 0.86 |
| " | 650 | 0.4 | 4653 | 0.68 |
| " | 750 | 0.4 | 70 | 0.96 |
| " | 800 | 0.4 | 50 | 0.53 |
| VGO | 800 | 0.4 | 850/2800 | 0.25/0.15 |
| " | 800 | 0.2 | 1600/3800 | 0.09/0.05 |

TABLE VII

| Feed | Temp. (°F.) | LHSV | N in product | kHDN |
|---|---|---|---|---|
| Distillate | 650 | 0.4 | 538 | 2.40 |
| " | 650 | 0.1 | 22 | 1.26 |
| " | 650 | 0.8 | 3475 | 1.75 |
| " | 690 | 0.4 | 227 | 1.58 |
| " | 690 | 0.2 | 41 | 1.27 |
| " | 650 | 0.4 | 2118 | 1.27 |
| " | 690 | 0.2 | 48 | 1.22 |
| VGO | 690 | 0.4 | 3164 | 0.54 |
| " | 690 | 0.2 | 1692 | 0.41 |
| " | 690 | 0.1 | 455 | 0.37 |
| " | 750 | 0.2 | 253 | 0.36 |
| " | 800 | 0.2 | 204/916 | 0.20/0.12 |

The data of the above Tables, evidences that the Pt promoted catalyst is superior in HDN behavior to the commercial catalyst. Furthermore, the plot of HDN rate constant, versus time on oil, given in FIG. 1 below, clearly shows that the Pt promotion dramatically decreases the rate of deactivation of the catalyst.

What is claimed is:

1. A catalyst composition comprised of: about 0.005 to 5.0 wt. % noble metal, about 0.5 to 5 wt. % of at least one other Group VIII metal selected from the group consisting of nickel, iron, and cobalt, and about 3 to 18 wt. % of a Group VI metal, and a refractory support, wherein the noble metal is incorporated into the refractory support by use of a precursor represented by $ML_2$ when the noble metal is Pt or Pd, and $ML_3$ when the noble metal is Rh or Ir, where M is the noble metal and L is a ligand selected from the dithiocarbanates, dithiophosphates, dithiophosphinates, xanthates, thioxanthates, and further wherein L has organo groups having a sufficient number of carbon atoms to render the noble metal complex soluble in oil.

2. The catalyst composition of claim 1 wherein the noble metal is selected from Pt and Rh.

3. The catalyst composition of claim 1 wherein the Group VI metal is molybdenum and the other Group VIII metal is Ni and/or Co.

4. The catalyst composition of claim 1 wherein the ligand L is represented by the formula

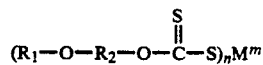

where
- $R_1$ is an alkyl group (straight, branched, or cyclic); an alkoxy substituted alkyl group; an aryl group; or a substituted aryl group,
- $R_2$ is a straight or branched alkylene group,
- M is the noble metal,
- m is the oxidation state of the noble metal, and
- n is an integer from 1 to 4.

5. The catalyst composition of claim 4 wherein $R_1$ is a straight chain alkyl group having 2 to 12 carbon atoms.

6. The catalyst composition of claim 5 wherein $R_2$ is comprised of about 2 to 8 carbon atoms.

7. The catalyst composition of claim 6 wherein each of $R_1$ and $R_2$ have from 2 to 4 carbon atoms.

8. The catalyst composition of claim 7 wherein about 1 to 4 wt. % of said other Group VIII metal and from about 8 to 14 wt. % of Group VI metal is present.

* * * * *